(12) United States Patent
Ghiran et al.

(10) Patent No.: US 6,915,672 B1
(45) Date of Patent: Jul. 12, 2005

(54) HYDROTAPPING POWER UNIT

(75) Inventors: Mircea M. Ghiran, Lake Orion, MI (US); Spyros P. Mellas, Waterford, MI (US); David R. Jensen, Swartz Creek, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/799,979

(22) Filed: Mar. 12, 2004

(51) Int. Cl.$^7$ .......................... B21D 28/28; B21D 39/20
(52) U.S. Cl. ........................ 72/55; 72/56; 83/53; 83/54; 29/421.1
(58) Field of Search ............................... 72/55, 56, 58, 72/61, 62, 370.27; 83/53, 54; 29/421.1, 897.2

(56) References Cited

U.S. PATENT DOCUMENTS

| | | | | |
|---|---|---|---|---|
| 3,919,871 A | * | 11/1975 | Andrasev et al. | ............... 72/55 |
| 5,321,964 A | | 6/1994 | Shimanovski et al. | ......... 72/62 |
| 5,398,533 A | | 3/1995 | Shimanovski et al. | ......... 72/55 |
| 5,737,952 A | * | 4/1998 | Baumann et al. | ............... 72/55 |
| 6,098,437 A | * | 8/2000 | Kocer et al. | .................... 72/55 |
| 6,442,820 B1 | * | 9/2002 | Mason | ....................... 29/421.1 |
| 6,591,648 B1 | * | 7/2003 | Ash et al. | ....................... 72/55 |
| 6,681,611 B2 | * | 1/2004 | Haag et al. | .................... 83/54 |

* cited by examiner

Primary Examiner—David B. Jones
(74) Attorney, Agent, or Firm—Laura C. Hargitt (57) ABSTRACT

A hydrotapping power unit is disclosed that is operable to position and hold a hydrotapping tool in a home position adjacent a part while the part is being hydroformed in a die cavity, to then advance the tool to pierce a hole in the hydroformed part while the part remains in the die cavity and under pressure and then continue to advance the tool to inwardly extrude the part about the hole, to then further advance while also rotating the tool so that the tool is fed at a feed rate equal to the thread pitch of the tool to thereby form a thread in the pierced hole, and finally to retract while also rotating the tool but in the reverse direction and at the same feed rate to release the tool from the threaded hole. The power unit performing these operations includes a linearly moveable shaft for holding the tool, a powered device for rotating the shaft, a powered device for linearly moving the shaft, and a lead screw connection between the latter powered device and the shaft having a thread pitch equal to that of the tool.

10 Claims, 5 Drawing Sheets

HYDROTAPPING POWER UNIT

TECHNICAL FIELD

This invention relates to a power unit for powering a hole-piercing/extruding/thread-forming tool and more particularly to a power unit adapted to powering such a tool in a prescribed manner so as to form a relatively deep threaded hole in a hydroformed part while the part remains in the hydroforming dies.

BACKGROUND OF THE INVENTION

In U.S. patent application Ser. No. 10/690,100 filed Oct. 21, 2003 and entitled "METHOD AND APPARATUS FOR FORMING A THREADED HOLE IN A HYDROFORMED PART" and assigned to the assignee of this invention, there is disclosed a tool for piercing a hole in a hydroformed part and then forming a thread in the hole while the part remains in the hydroforming dies following its hydroforming. Wherein the tool which is referred to as a hydrotapping tool (1) first pierces the hole in a tool advancing tool operation while the hydroforming pressure is maintained, (2) then extrudes the wall about the hole in a continued tool advancing operation to thereby deepen the hole, (3) then sizes the deepened hole in a continued tool advancing operation, (4) then in a turning and advancing tool operation forms a thread in the hole in a metal displacing operation, and (5) then is retracted from the threaded hole while being rotated in the opposite direction in order to release the tool from the threaded hole. And wherein in the thread forming operation, the tool must be fed at a feed rate equal to that of the thread forming portion of the tool and at this same feed rate but in the opposite direction in order to retract the tool from the threaded hole without wiping out the formed thread.

While a power arrangement suitably adapted to powering the tool as disclosed in the aforementioned U.S. patent application Ser. No. 10/690,100 would be satisfactory in many cases, there remains a need for a rugged and highly reliable power unit for powering such a tool in meeting the demands of high volume production. Such as for example the hydroformed parts used in mass-produced motor vehicles. Wherein one or more threaded holes are required in the hydroformed part and each threaded hole must be accurately located and the thread formed therein made strong and precise and all without producing slugs and metal cuttings that could enter the part and contaminate the hydroforming apparatus. Such as is the case with use of the above tool that pierces, extrudes and forms a thread in the thus produced deepened hole and as distinguished from the use of a drill, extruding pin and thread cutting tap to form the required threaded hole.

SUMMARY OF THE INVENTION

The present invention meets the goals of sufficiently and efficiently powering such a hydroforming tap with a sturdy and reliable hydrotapping power unit comprising a first powered device, a linearly moveable shaft that is adapted to hold the tool, a second powered device for rotating the shaft, and a lead screw connection operatively connecting the shaft and the first powered device having a thread pitch equal to that of a thread-forming portion of the tool. The second powered device is operable to rotate the shaft in a forward direction and in cooperation with the lead screw connection advance the shaft so as to locate a piercing end of the tool in a position at least substantially flush with a surrounding surface of the die cavity.

The first powered device is adapted to then cooperate with the lead screw connection to further advance the shaft in a single advancing stroke such that the tool pierces a hole in the part while hydroforming pressure is maintained in the part and then an extruding portion of the tool enters the hole and extrudes the part about the hole and wherein the powered device is then in a fully extended condition. The second powered device is then operable to again rotate the shaft in the forward direction while the first powered device remains in a fully extended condition and in co-operation with the lead screw connection further advance the tool at a feed rate equal to the thread pitch of the thread-forming portion of the tool and resultantly forms a thread in the hole by material displacement. The second powered device is then further operable to rotate the shaft in a reverse direction while the first powered device remains in its fully extended condition whereby the shaft in cooperation with the lead screw connection retracts the tool from the threaded hole at the same feed rate but in the opposite direction.

These and other aspects of the present invention will become more apparent from the accompanying drawings and the following description of exemplary embodiments of the invention.

DESCRIPTION OF EXEMPLARY EMBODIMENTS

Figure 1:
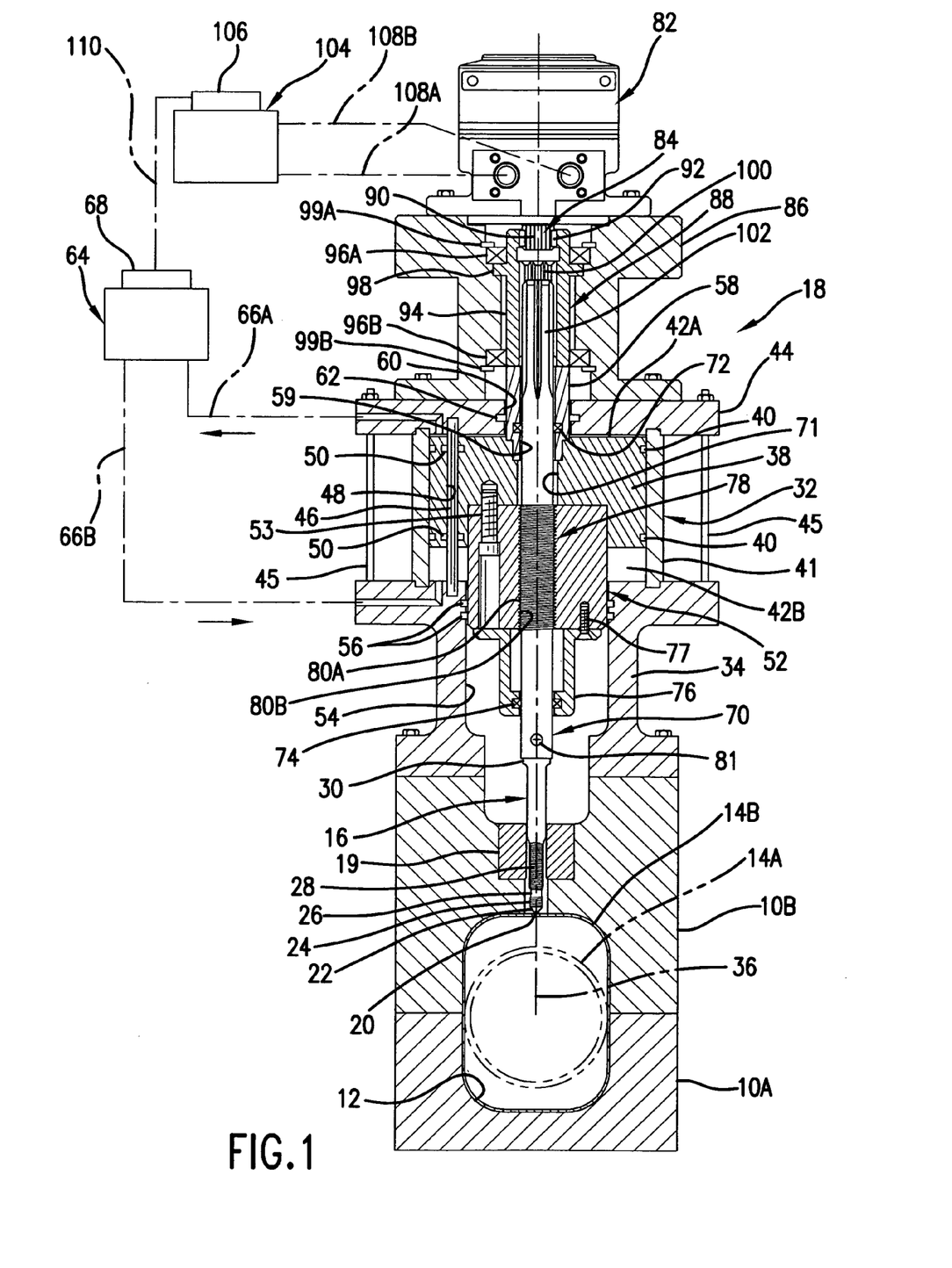
FIG. 1 is a partial side view mainly in section of hydroforming apparatus including a hydrotapping power unit according to the present invention wherein the tool powered by the unit is shown in a home position prior to forming a threaded hole in a hydroformed part.

Referring to FIG. 1, there is shown a portion of a conventional hydroforming apparatus comprising a lower die 10A and upper die 10B that when closed as shown cooperatively form a die cavity 12 having a surface conforming to the required shape of the finished part. In the hydroforming process and in a conventional manner, a piece of tubular metal stock 14A as shown in phantom lines is captured between the dies in the die cavity and a hydroforming fluid (typically in the form of a water based liquid solution) is then delivered to the interior thereof through one end of the part while exit from the other end is blocked. With the hydroforming fluid thus delivered being raised to a pressure sufficient to forcibly expand the wall of the captured part outward against and conform to the cavity surface to thereby form a hydroformed part 14B having the required shape as shown in solid lines.

Following the formation of a threaded hole required in the hydroformed part as described below and also possibly the formation of one or more required holes in hydroformed part that could be accomplished simultaneously therewith, the hydroforming fluid that remains in the finished part is then exhausted. And also in a conventional manner through the above-mentioned other end to permit opening of the dies and removal of the finished part.

Further details of the type of hydroforming apparatus for which the present invention is suited are for example disclosed in U.S. Pat. No. 5,321,964 assigned to the assignee of this invention and which is hereby incorporated by reference. In addition, details of various types of apparatus for hydropiercing a required hole in a hydroformed part while remaining in the hydroforming dies are for example disclosed in U.S. Pat. Nos. 5,398,533 and 5,666,840 which are also assigned to the assignee of this invention and which are hereby also incorporated by reference.

The formation of a required threaded hole in the hydroformed part 14B, which can be performed simultaneously with the piercing of one or more required holes in the part, is provided by a singular tool 16 that is powered by a power unit 18 according to the present invention. The threaded hole required in the part 14B is in this example located in an upper side of the hydroformed part that is located in the upper die 10B. And a changeable die button or guide bushing 19 for receiving and guiding the tool 16 is received in a stepped bore in the upper die 10B that extends through the die cavity surface and is centered on where the threaded hole is required in the part.

The tool 16 is like the tool embodiment disclosed in FIG. 11 of the aforementioned U.S. patent application Ser. No. 10/690,100 which is hereby incorporated by reference. The tool 16 is referred to therein as a hydrotapping tool and accordingly, the power unit 18 is referred to herein as a hydrotapping power unit as it is specially adapted to power such a tool. And it will also be understood that while only one of the tool embodiments is described and shown herein, the other tool embodiments disclosed in the aforementioned U.S. patent application Ser. No. 10/690,100 have the same power requirements and can also be powered by the power unit 18 in a like manner to form a threaded hole in a hydroformed part while the part remains in the hydroforming dies.

In order to understand and fully appreciate the contributions and advantages of the hydrotapping power unit 18, it is necessary to understand the power requirements of the hydrotapping tool 16 which will now be described. The tool 16 is basically a one-piece tool having a hole-piercing end portion 20 at one end, an extruding portion 22 adjoining the end portion, a hole-sizing portion 24 adjoining the extruding portion, a relief portion 26 adjoining the hole-sizing portion, a thread-forming portion 28 adjoining the relief portion, and a tool-fastening portion 30 with a square-shaped cross-section at the other end of the tool.

The tool 16 must be initially positioned and held in the guide bushing 19 so that its piercing end is flush or at least only slightly retracted with respect to the immediately surrounding die cavity surface during the hydroforming of the part and is adapted on advancement of the tool in the guide bushing 19 to pierce and form a hole in the part without producing a separated slug and while the hydroforming pressure remains in the part to support this operation. The extruding portion 22 of the tool is in contrast adapted on continued tool advancement to enter the pierced hole and extrude an annular region of the wall of the part extending about the hole to a predetermined depth inward of the part while radially expanding the hole outward along its depth And wherein the extruding operation by the tool is assisted with a flushing and lubricating action by the hydroforming fluid that is forced outward past the tool by the pressure remaining in the part after the piercing operation.

The hole-sizing portion 24 of the tool has a partial thread by which it is adapted at its helically extending crest and on continued tool advancement to radially expand the extruded annular portion to enlarge the hole to a predetermined diameter suited to the formation of the required thread therein by material displacement as distinguished from metal removal with a thread cutting tap. Whereby the extruding and hole-sizing tool operations form an inwardly extending annular neck portion in the part defining the hole with a wall thickness substantially the same as the part but a depth dimension that is considerably larger than the wall thickness. And wherein this depth can be varied by the amount of extrusion to allow for a sufficient number of threads to be formed in hole in order to securely hold a particular screw or a bolt.

The thread-forming portion 28 of the tool has a full thread that with the intervening relief portion 26 is an interrupted continuation of the partial thread of the hole-sizing portion 24 and has the same pitch but a relatively sharp edged crest and a larger major diameter. The full thread is by selection of a suitable conventional thread-forming configuration adapted to form the required thread in the wall of the hole on continued tool advancement and now turning of the tool in the proper direction. In this example, the proper direction is a right-hand or clockwise direction because the required threaded hole in the hole of the part has a right-hand thread and therefore so are the tool threads.

In order to form the thread in the hole without a cutting action and provide for tool extraction without wiping out part of the formed thread, the tool 16 must be fed in the thread-forming operation at a feed rate equal to the pitch of the tool thread in the thread-forming portion 28 and in the proper rotational direction. On the other hand, the relief portion 26 of the tool is to enter the sized hole without rotation and serves to minimize the friction between the part and the tool following the sizing operation and at the starting of tool rotation to form the thread. With the result that there is efficiently produced a strong and precise thread in the extruded annular section of the hydroformed part by displacing or reorienting material rather than removing material as with a thread cutting tap.

Following the forming of the threaded hole in the part, the tool 16 must be retracted at the same feed rate while being rotated in the opposite or left-hand or counter-clockwise direction to free the tool from the thus formed threaded hole and allow the finished part to be removed from the dies. With the partial thread in the hole-sizing portion 24 of the tool because of its significantly smaller major diameter not wiping out the formed thread in the part as the tool is threadably backed out.

Describing now the hydrotapping power unit 18 and with reference to FIG. 1, the power unit is rigidly mounted on the upper die 10B so as to locate and orient the tool 16 in aligned relationship with the guide bushing 19 in the upper die 10B that acts to pilot the tool within this die. The power unit 18 comprises a powered device 32 which in the exemplary embodiment is a hydraulic cylinder having a mounting base 34 that is bolted or otherwise fixed by suitable means to the upper die 10B so as to locate the centerline 36 of the hydraulic cylinder 32 in alignment with the guide bushing 19.

The hydraulic cylinder 32 has a piston 38 with seals 40 received in a cylinder 41 and is operated by the selective supply of hydraulic fluid to and the exhaust of the fluid from chambers 42A and 42B at opposite ends of the cylinder. Whereby the piston 38 is forced to move linearly along the centerline 36 between a fully retracted position and a fully advanced position as determined by the piston contacting with the ends of the cylinder wherein the upper end of the base 34 forms one of these ends and an end member 44 that is fixed by studs 45 to the base 34 forms the other end.

The piston 38 is prevented from rotating by a stationary rod 46 that is located parallel to the centerline 36 and extends through a bore 48 in the piston. The bore 48 and thereby the rod 46 is radially spaced from the centerline 36 and seals 50 mounted in annular recesses in the bore 48 prevent leakage past the rod 46 and between the chambers 42A and 42B.

A changeable lead screw nut 52 with a cylindrical outer periphery is fixed to one end of the piston 38 by bolts 53 (only one of which is shown) and is closely slidably received in a bore 54 in the mounting base 34. And seals 56 are received in annular recesses in the bore 54 and about the lead screw nut 52 to prevent leakage outward past the latter.

Another cylindrical member 58 of smaller diameter than the lead screw nut 52 and with a centrally located bore 59 without an internal thread is fixed with a press-fit or other suitable means to the other end of the piston 38 and is closely slidably received in a bore 60 in the end member 44. And a seal 62 is received in an annular recess in the bore 60 and about the end member 44 to prevent leakage outward past the end member 44.

The bores 54 and 60 receiving the respective cylindrical members 52 and 58 are centered on the centerline 36 and thereby precisely center the piston 38 on the centerline 36 for centered linear movement there along. While the coupling of the piston 38 to these members prevents their rotation because of the rod 46 that directly prevents rotation of the piston and acting through the piston positively prevents rotation of these members.

The hydraulic cylinder 32 is controlled by a hydraulic control system 64 of a suitable conventional type. Wherein the control system 64 is connected by hydraulic lines 66A and 66B to the respective chambers 42A and 42B and includes a programmable controller 68 that is programmed to operate the hydraulic cylinder 32 and thereby the tool 16 as described in detail later.

A changeable center shaft 70 for holding and directly operating the tool 16 extends centrally through the lead screw nut 52, the bore 59 in cylindrical member 58 and a centrally located bore 71 in the piston 38 and is supported at locations outboard the ends of the piston by anti-friction bearings 72 and 74. Wherein the bearings 72 and 74 are mounted in the cylindrical member 58 and a bearing support member 76, respectively. And wherein the bearing support member 76 is fixed to the outboard end of the lead screw nut 52 with screws 77 (only one of which is shown) and extends outwardly there from to optimize support for this end of the center shaft 70 where it extends from the power unit to hold the tool 16. And wherein the center shaft mounting arrangement locates the center shaft axis to coincide with the centerline 36 and thereby that of the tool guide bushing 19.

The center shaft 70 is operatively connected to the piston 38 of the hydraulic cylinder 32 by a lead screw connection 78. Wherein the lead screw connection 78, in addition to including the lead screw nut 52, comprises an external thread 80A on the center shaft 70 that is in continuous threaded engagement with a centrally located threaded hole 80B in the lead screw nut 52. And because the lead screw nut 52 is by its connection with the piston prevented from rotating by the rod 46 while allowed to move linearly, the center shaft 70 is moved linearly and conjointly with the piston 38 and alternatively, the center shaft is also capable of being moved linearly independent of the piston 38 by rotation of the center shaft and operation of the lead screw connection 78.

The center shaft 70 extends outwardly past the bearing support member 76 and is adapted to firmly hold the tool 16 in axial alignment with the centerline 36 and the tool-receiving bore in the tool guide bushing 19. With such holding provided by a socket formed in this end of the shaft that matches with and closely receives the square-shaped section of the fastening portion 30 of the tool 16 where it is firmly held in place by a setscrew 81 for entry to and exit from the tool guide bushing 19 in the upper die 10B.

The required feed rate to be imparted by the center shaft 70 to the tool 16 for both forming the required thread and then retracting the tool from the formed thread is effected by the lead screw connection 78 between the center shaft 70 and the piston 38 of the hydraulic cylinder. Wherein the lead screw connection 78 is provided with a thread pitch equal to that of the partial thread portion 24 and full thread portion 28 of the tool 16. And therefore is matched to whatever thread is required in the part and therefore that of the hydrotapping tool required to form the required threaded hole in the part.

In addition to being selectively operated by the hydraulic cylinder 32, the center shaft 70 is also selectively operated by a second powered device 82 centered on the centerline 36 that in the exemplary embodiment is a hydraulic motor of a suitable conventional type. The hydraulic motor 82 has an output shaft 84 projecting from one end thereof and a mounting base 86 that is bolted or otherwise suitably fixed to the stationary end member 44 of the hydraulic cylinder 32.

The motor output shaft 84 is drivingly connected to the center shaft 70 by a coupling device 88 comprising an external splines 90 formed on the end of the output shaft which are received by a first set of internal splines 92 in a rotatably supported coupling member 94. The coupling member 94 is supported for rotation in the motor mounting base 86 by anti-friction bearings 96A and 96B that are located at the outboard ends of the coupling member and are received in counter bores in the motor mounting base 86. And the coupling member 94 is held in a fixed axial position by an integral collar 98 that is received in the same counter-bore in the mounting base 86 as the bearing 96A where it together with this bearing is trapped by a retaining ring 99A. While another retaining ring 99B retains the other bearing 96B in position.

The coupling member 94 has a second set of internal splines 100 that are substantially longer than the first set of internal splines 92 and that are engaged with external splines 102 on the projecting end of the center shaft 70 that projects outwardly from the piston guide/center shaft supporting member 58 of the hydraulic cylinder. The slidably engaged splines 100 and 102 connecting the coupling member 94 and thereby the motor output shaft 84 to the center shaft 70 have axial lengths such that this connection is maintained in all axial positions of the linearly moveable center shaft. Wherein the center shaft splines 102 slide with respect to the coupling member splines 100 which are prevented from axial movement by the mounting of the coupling member.

Thus, the hydraulic motor 82 on rotating its output shaft 84 in either direction is connected by the coupling device 88 to conjointly rotate the center shaft 70 in the same direction. Whereupon the center shaft 70 and thus the tool 16 is because of the lead screw connection 78 either advanced toward or retracted from the hydroformed part depending on which direction the motor output shaft 84 is being powered by the motor. With the long splines 100 and 102 of the respective coupling member and center shaft maintaining this drive connection as the center shaft 70 is caused to move linearly with respect to the piston 38 and the output shaft 84 of the hydraulic motor 82. And also when the center shaft 70 is moved with the piston 38 by the lead screw connection 78 when the hydraulic motor output shaft 84 is not rotating.

The hydraulic motor 82 has a hydraulic control system 104 including a programmable controller 106. Wherein the control system is connected by hydraulic lines 108A and 108B to the motor and the motor controller 106 is programmed to operate the hydraulic motor 82 and thereby the tool 16 as described in detail later. And wherein the hydraulic motor controller 106 is connected by a communication link 110 with the hydraulic cylinder controller 68 so that the two control systems are coordinated to operate in conjunction with each other to selectively power the tool with the hydraulic cylinder 32 and the hydraulic motor 82 in forming a threaded hole in the part as described below.

Describing now the operation of the hydrotapping power unit 18 in the forming of a required threaded hole in the part 14B, the piston 38 and the center shaft 70 are initially positioned by the hydraulic cylinder 32 and the hydraulic motor 82, respectively, in the positions shown in FIG. 1 at the start of the hydroforming process. Wherein the tool 16 is positioned in what will be referred to as a home position in the tool guide bushing 19 with its piercing end 20 flush with the surrounding die cavity surface or slightly retracted with respect thereto. And wherein the home position of the tool is established by the piston 38 being fully retracted by the supply of hydraulic fluid under pressure to the chamber 42B and the exhausting of chamber 42A as shown by the directional flow arrows. And the hydraulic motor 82 having rotated the center shaft 70 as need be and through operation of the lead screw connection 78 so positioned the tool while the piston 38 is fully retracted.

Then in the hydroforming of the part and while the tool is held in its home position with the lead screw connection 78 and the retracted piston 38, the wall of the part is formed outwardly against the die cavity surface and the piercing end of tool 16 but is not pierced by the latter. And wherein the piercing end of the tool 16 may be positioned in a slightly retracted home position with respect to the surrounding die cavity surface as it was found that this will not adversely affect the subsequent piercing operation described below.

Figure 2:
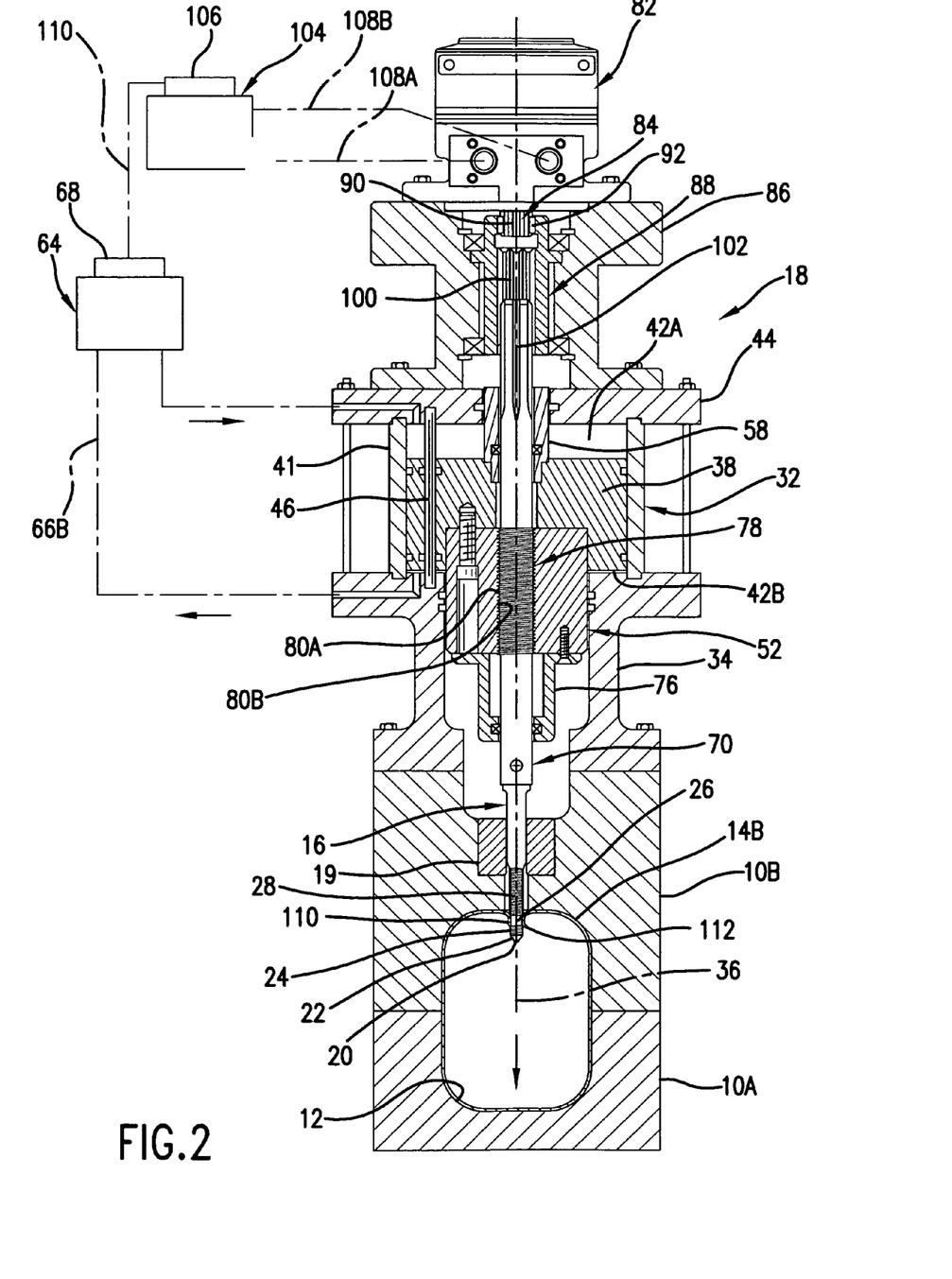
FIG. 2 is a view similar to FIG. 1 but showing the tool advanced and piercing a hole in the part and then extruding the part inwardly about the hole.

Referring to FIG. 2 and immediately following the hydroforming of the part and while the hydroforming pressure is maintained in the part, the center shaft 70 is advanced by the piston 38 by the supply of hydraulic fluid under pressure to the chamber 42A and the exhausting of chamber 42B as shown by the directional flow arrows. Wherein the piston 38 then operates through the lead screw connection 78 between the piston and the center shaft to advance the center shaft and thereby the tool. And wherein the center shaft 70 is permitted such linear movement with respect to the then idle hydraulic motor 82 by the center shaft splines 102 sliding with respect to the coupling splines 100 while continuing to remain in engagement therewith.

This advancement of the tool 16 by the piston 38 continues in a single stroke until the piston is fully advanced in the hydraulic cylinder 32 and in the process causes the tool to first pierce a hole in the hydroformed part 14B with its hole-piercing end portion 20 and thereafter inwardly extrude the wall of the part about the hole and thereby deepen the hole with its extruding portion 22 and then properly size the hole with its hole-sizing threaded portion 28 for the subsequent thread forming operation.

In this initial phase of tool operation, the tool 16 is not rotated and the hydroforming pressure supports the wall of the part against collapsing and distorting during the piercing operation at least until the pressure drops significantly at the point where the wall is actually pierced through. And with it being understood that the wall of the part is sufficiently strong because of its thickness and/or type of material or the piercing end of the tool is of sufficient area to prevent premature piercing of the wall by the hydroforming pressure forcing the wall outward against the tool during the hydroforming of the part.

Also in this initial phase of tool operation which occurs without tool rotation, the extruding portion 22 of the tool 16 is adapted with such continued advancement by the piston 38 to enter the pierced hole and by extrusion form an inwardly extending internal tubular neck portion 110. Wherein the neck portion 110 defines a thus expanded and substantially deepened hole in the part prior to the hole-sizing tool portion 24 entering the hole to size it to the proper diameter for tapping by material displacement as distinguished from a thread cutting operation.

The piercing end portion 20 of the tool at the end of the piercing operation produces one or more appendages 112 that remain integral with the inner edge of the neck portion 110. Wherein the number of such appendages depends on the shape of the piercing end of the tool as disclosed in the aforementioned U.S. patent application Ser. No. 10/690,100. With only one such appendage as shown occurring in this example as a result of using the exemplary tool 16. And it will also be understood that the configurations of the respective hole piercing end portion 20 and extruding portion 22 of the tool 16 are determined dimensional wise for a particular application so as to pierce and extrude the wall of the part inwardly to the extent necessary to form the wall of the hole with a depth or axial extent that allows the formation therein of the number of threads required to adequately secure a particular screw or bolt or male-threaded part.

When the wall of the part is initially pierced in the hydropiercing operation by the piercing end portion 20 of the tool, there will occur a sudden drop in the hydroforming pressure within the part. This pressure drop may for example be 80% of the forming pressure but it has been found that the remaining 20% is sufficient to force the hydroforming fluid to advantageously both flush and lubricate the extruding tool portion 22 to thus facilitate its extruding operation as it proceeds to advance into the pierced hole and inwardly extrude the wall of the part about the pierced hole.

At the end of this initial phase of tool operation which has occurred with a single advancing full stroke of the piston 38 and without tool rotation, the relief portion 26 of the tool has entered the hole as shown in FIG. 2. And at that point the hydraulic motor 82 is then caused to rotate the center shaft 70 while the piston 38 remains in its fully advanced position by the directing of hydraulic fluid under pressure with respect to the motor via the hydraulic lines 108A and 108B as shown by the directional flow arrows. Whereby with the driving of the center shaft 70 by the hydraulic motor 82, the tool 16 is now further advanced and also rotated in the right-hand or clockwise direction at a feed rate equal to the thread pitch of the tool because of the lead screw connection 78 between the center shaft and the non-rotatable piston 38 having the same thread pitch. And wherein the initial rotation of the tool 16 has occurred with minimized friction between the part and the tool following the hole-sizing operation. Because the relief portion 26 of the tool is then located in the hole and has a smooth annular surface whose maximum diameter is less than the thread crest diameter of the partial thread portion 24 of the tool.

Figure 3:
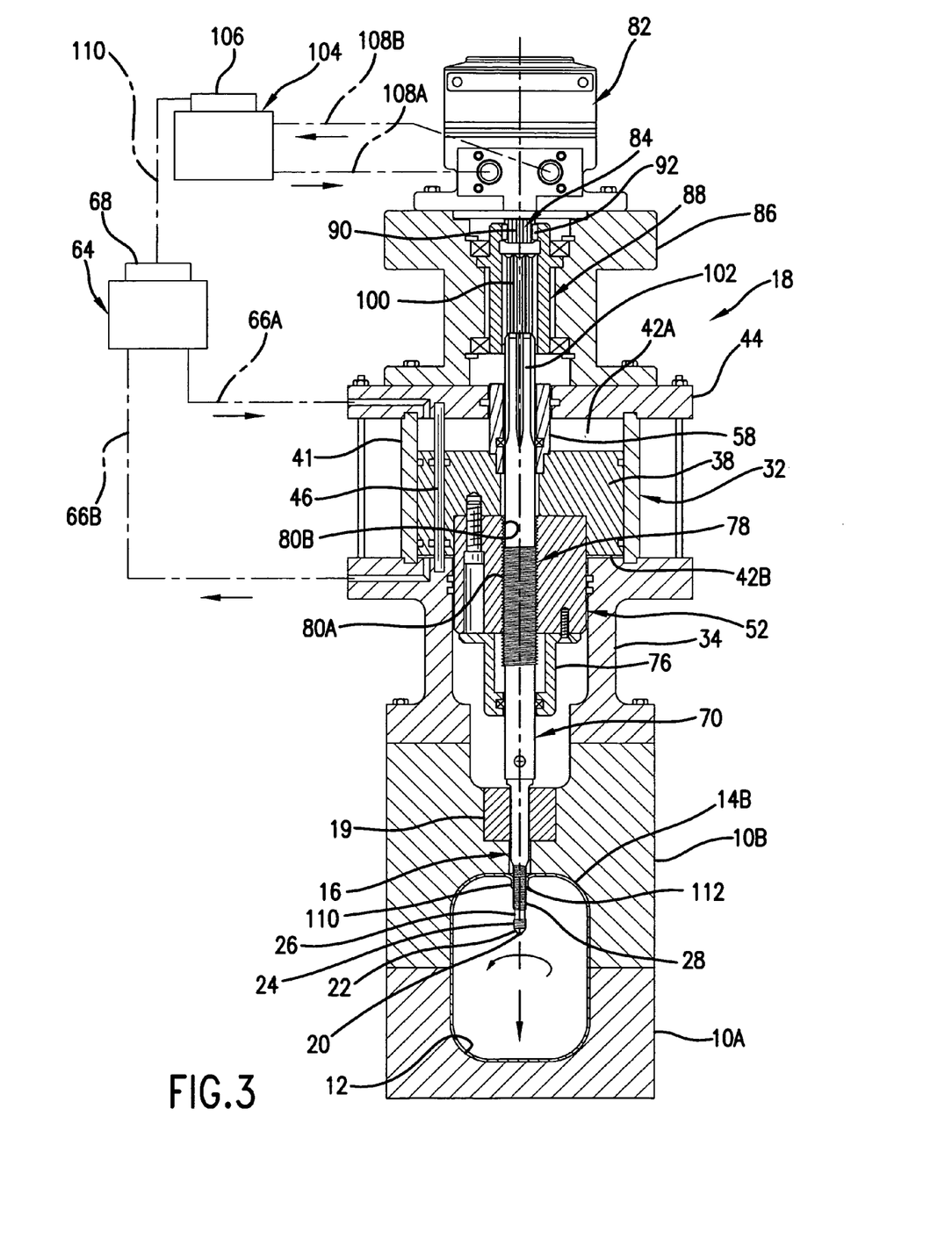
FIG. 3 is a view similar to FIG. 2 but showing the tool further advanced and now rotated to form a thread in the hole.

The hydraulic motor 82 continues to thus power the center shaft 70 and thereby form the required thread in the hole-defining neck portion 110 with the thread-forming portion 28 of the tool 16. See FIG. 3. Wherein the lead screw connection 78 feeds the tool with such motor operation at the required feed rate to form the thread by material displacement. And wherein the full thread portion 28 of the tool displaces most of the material (approximately 95%) to the inside of the groove or crevice of this thread in forming the thread in the wall of the part. With the small remainder of material being displaced radially outward but not enough to make a significant difference in the outer surface of the hole-defining tubular neck portion 110.

Figure 4:
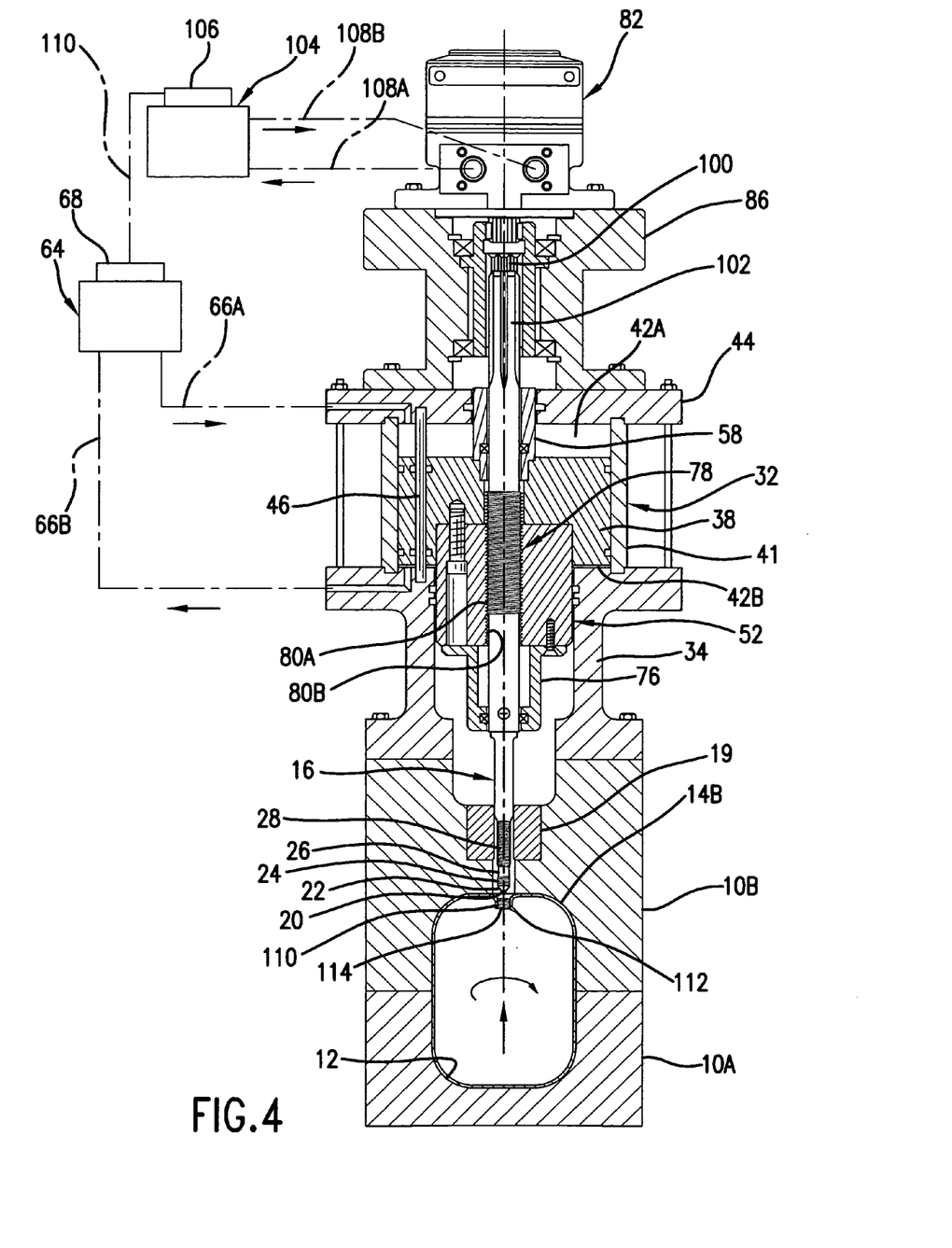
FIG. 4 is a view similar to FIG. 3 but showing the rotation of the tool reversed and retracted.

Following the formation of the thread with the full thread portion 28 of the tool 16 and while the piston 38 remains at its fully advanced position, the tool 16 is then retracted from or backed out of the thus formed thread 114 by the hydraulic motor 82 rotating the center shaft 70 and thereby the tool 16 in the left-hand or counter-clockwise direction. See FIG. 4. Wherein the tool 16 is retracted by operation of the lead screw connection 78 at the same feed rate used to form the thread 114 but now in the opposite or reverse direction by the directing of hydraulic fluid under pressure with respect to the motor 82 via the hydraulic lines 108A and 108B as shown by the directional flow arrows. And wherein the partial thread portion 24 of the tool then follows the full thread portion 28 of the tool and because of its being only a partial thread without a sharp crest, the then trailing partial thread does not wipe the crest off the formed thread and the tool eventually exits the part.

Figure 5:
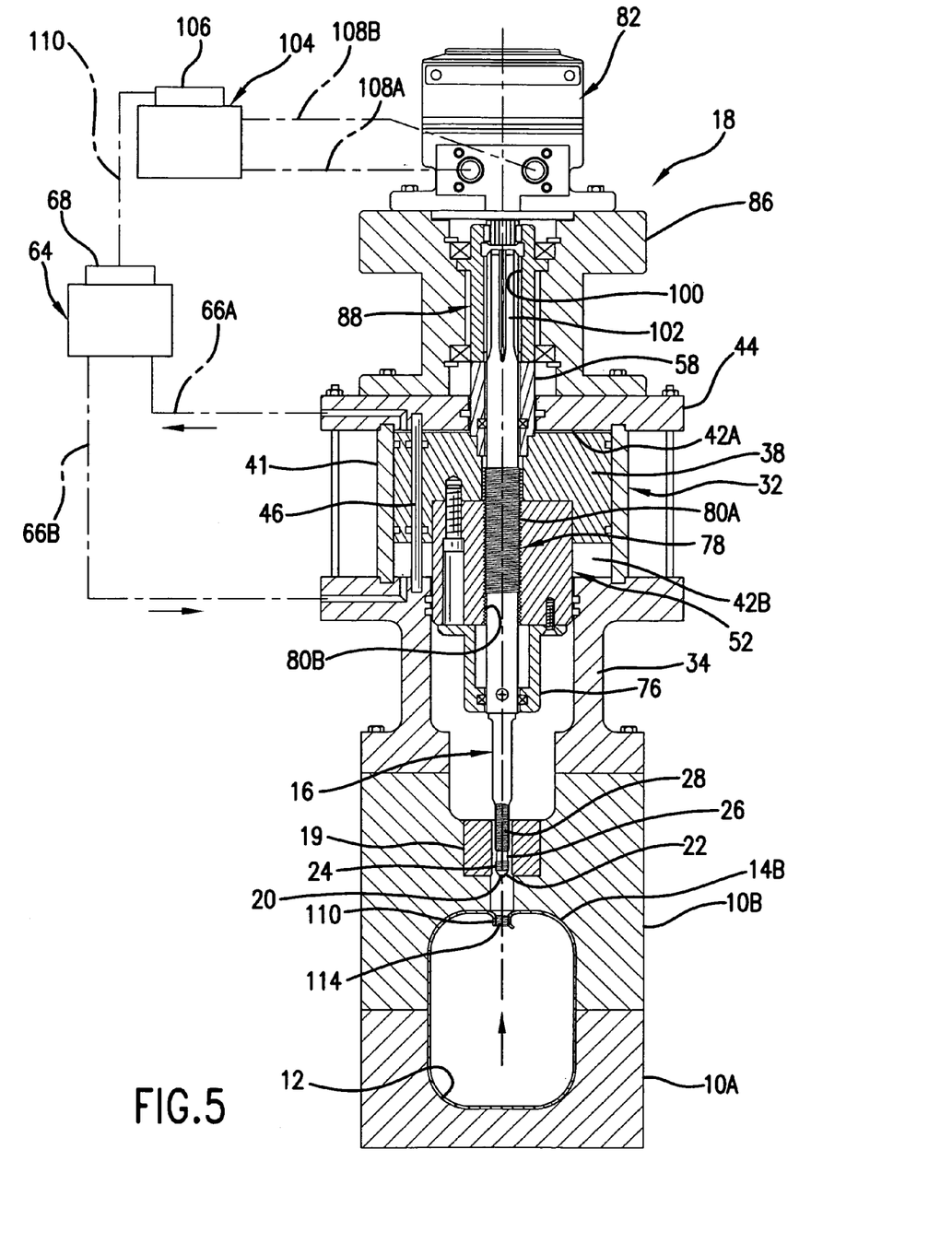
FIG. 5 is a view similar to FIG. 4 but showing the tool further retracted to a final position.

On exiting the thus formed threaded hole, the operation of the hydraulic motor 82 is ceased and the tool 16 is then further retracted to the position shown in FIG. 5 by operation of the hydraulic cylinder 32 returning the piston 38 to its fully retracted position. Wherein hydraulic fluid under pressure is again supplied to chamber 42B and chamber 42A is again exhausted as shown by the directional flow arrows. And thus restoring the power unit 18 to a condition where it would again be operated as described above and with clockwise rotation of the center shaft 70 to position the tool 16 in its home position for the processing of another hydroformed part.

Following the formation of the part 14B with the required threaded hole, the part is exhausted of any remaining hydroforming fluid pressure in a conventional manner. And the dies are then opened and the part is removed to clear the dies for the processing of another part.

As to the threaded configuration of the tool 16 and the feed rate imparted to the tool by the hydrotapping power unit 18 as described above and in relation to a certain required threaded hole, the required thread may for example be an 8×1.25 mm thread. In that case, (A) the hole-piercing end portion 20, extruding portion 22 and the hole-sizing expanding portion 24 of the tool are dimensioned accordingly to form the desired dimensions for the resulting tubular neck portion 110, (B) the full thread portion 28 is provided with the required thread forming configuration for an 8×1.25 mm thread, (C) the partial thread portion 24 is provided with the same pitch but with a major diameter at its helical crest that is substantially smaller than the major diameter of the full thread portion 28 such that the partial thread can freely turn through a 8×1.25 mm thread, (D) the relief portion 26 of the tool is provided with a maximum diameter less than the minor diameter of the 8×1.25 mm thread, and (E) the lead screw connection 78 between the center shaft 70 and the piston 38 is selected to have the same pitch as the partial thread and full thread of the tool; namely a 8×1.25 mm thread in order to provide the required tool feed rate for forming the thread and also releasing the tool there from without disturbing the formed thread. And wherein it will be understood that for each application of the power unit 18 with a particular hydroforming tapping tool, a center shaft 70 and an internally threaded member 52 having the required thread pitch are used that match the threads of the tool and may be selected from a stock of corresponding interchangeable parts having a range of thread pitches.

In further regard to the control of the powered devices 32 and 82 in performing the above described operations, the controllers 68 and 106 can be programmed to operate the respective hydraulic control systems 64 and 104 by simply encoding the motor controller 106 to count output shaft revolutions and detecting the real time position of the center shaft 70 with a linear position transducer or a set of proximity switches associated with the center shaft. It will also be appreciated that the speed of linear movement of the center shaft 70 effected by operation of the piston 38 of the cylinder 32 can be adjusted with the controller 68. And can for example be made significantly faster than the linear feed rate for forming the thread and extracting the tool from the threaded hole. And as a result minimize the total cycle time of the power unit 18 in forming the threaded hole and releasing there from. Such an optimum piston speed can for example be determined during the setup of the hydrotapping power unit before a production run. Wherein the speed of the hydraulic cylinder operation can be adjusted through instructions to the controller for the hydraulic cylinder control system based on such trials in order to obtain the fastest optimum time necessary to complete the hydraulic cylinder operations.

It will also be appreciated that the speed of linear movement of the hydraulically operated piston 38 and thereby that of the tool 16 for the piercing, extruding and hole sizing operations can be adjusted in the hydraulic cylinder control system 64 by the controller 68 and for example be made significantly faster than the linear feed rate for forming the thread and extracting the tool from the threaded hole. And as a result minimize the cycle time of the power unit 18 in forming the threaded hole by setting the speed of operation of the hydraulic cylinder at the optimum fastest speed for a particular application of the power unit with a particular tool. Which for example can be determined for each particular application during the setup of the hydrotapping power unit 18 and the use of a particular hydrotapping tool and the lead screw connection necessary for proper operation of this tool in operating on a particular hydroformed part. And wherein with the optimum speeds of operation thus determined for the hydraulic cylinder 32, the controller 68 is so instructed to control the hydraulic system 64 accordingly.

Moreover, since the feed rate for forming the thread and later retracting the tool from the formed thread is determined by the lead screw connection 78 independent of the speed of the hydraulic motor, the optimum fastest speeds of the motor can like wise be determined during setup for a particular application. And the motor controller 106 instructed accordingly to minimize the time of the thread forming and tool extraction operations and thereby the total cycle time of the power unit.

Having disclosed the presently preferred exemplary embodiments, various forms of the hydrotapping power unit according to the present invention are likely to result from such disclosure to those skilled in this art. Therefore, the invention is to be limited only by the scope of the appended claims.

What is claimed is:

1. A hydrotapping power unit for powering a hydrotapping tool comprising a shaft adapted to advance and retract the tool with respect to a part contained in a hydroforming die cavity, a first powered device, a lead screw connection connecting said first powered device and said shaft having a thread pitch equal to that of a thread-forming portion of the tool, a second powered device fixed in position in relation to said first powered device and drivingly connected to said shaft and adapted to rotate said shaft in a forward direction and in cooperation with said lead screw connection advance and hold said shaft and thereby the tool in a home position where a piercing end of the tool is located at least substantially flush with the die cavity during hydroforming of the part, said first powered device adapted to cooperate with said lead screw connection to further advance said shaft after the hydroforming of the part and thereby force the piercing end of the tool to pierce a hole in the part while hydroforming pressure is maintained in the part and thereafter continue to advance said shaft causing an extruding portion of the tool to enter the hole and inwardly extrude the part about the hole, said second powered device operable to again rotate said shaft in said forward direction and in cooperation with said lead screw connection further advance the tool and thereby form a thread in the hole with the thread-forming portion of the tool, and said second powered device operable to rotate said shaft in a reverse direction and in cooperation with said lead screw connection retract the tool from the threaded hole at the same said feed rate.

2. The hydrotapping power unit as set forth in claim 1 wherein said first powered device is a hydraulic cylinder and said second powered device is a hydraulic motor.

3. The hydrotapping power unit as set forth in claim 1 wherein said first powered device includes a hydraulically operated piston that is prevented from rotation, and said lead screw connection operatively connects said piston and said shaft.

4. The hydrotapping power unit as set forth in claim 1 wherein said first powered device includes a hydraulically operated piston that is prevented from rotation and is connected to said shaft by said lead screw connection and is adapted to cooperate with said lead screw connection to hold the tool in said home position during the hydroforming of the part and also the piercing of the part.

5. A hydrotapping power unit as set forth in claim 1 wherein said first powered device is adapted to also advance a hole-sizing portion of the tool and then a relief portion of the tool into the pierced hole and wherein the hole-sizing portion has a partial thread with the same pitch as the thread-forming portion of the tool, and said second powered device is adapted to start forward rotation of said shaft while the relief portion of the tool is in the pierced hole following the entry of the hole-sizing portion.

6. A hydrotapping power unit as set forth in claim 1 wherein said first powered device is a stationary hydraulic cylinder having a non-rotatable piston connected by said lead screw connection to said shaft, and said second powered device is a stationary hydraulic motor.

7. A hydrotapping power unit as set forth in claim 1 wherein a coupling device maintains a drive connection between said second powered device and said shaft throughout linear movement of said shaft with respect to said second powered device.

8. A hydrotapping power unit as set forth in claim 1 wherein said powered devices and said shaft have a common centerline.

9. A hydrotapping power unit as set forth in claim 1 wherein said powered devices are adapted to be operated at various speeds of operation.

10. A hydrotapping power unit as set forth in claim 1 wherein said second powered device is mounted on said first powered device.

* * * * *